United States Patent
Song et al.

(10) Patent No.: US 9,781,481 B2
(45) Date of Patent: Oct. 3, 2017

(54) APPARATUS AND METHOD FOR GENERATING/RECOVERING MOTION INFORMATION BASED ON PREDICTIVE MOTION VECTOR INDEX ENCODING, AND APPARATUS AND METHOD FOR IMAGE ENCODING/DECODING USING SAME

(71) Applicant: SK TELECOM CO., LTD., Seoul (KR)

(72) Inventors: Jinhan Song, Seoul (KR); Jeongyeon Lim, Seongnam-si (KR); Haekwang Kim, Seoul (KR); Joohee Moon, Seoul (KR); Yunglyul Lee, Seoul (KR); Jongki Han, Seoul (KR); Byeungwoo Jeon, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/400,293

(22) Filed: Jan. 6, 2017

(65) Prior Publication Data
US 2017/0118525 A1   Apr. 27, 2017

Related U.S. Application Data

(63) Continuation of application No. 13/946,624, filed on Jul. 19, 2013, now Pat. No. 9,578,330, which is a (Continued)

(30) Foreign Application Priority Data

Jan. 21, 2011   (KR) .................... 10-2011-0006248

(51) Int. Cl.
*H04N 7/26* (2006.01)
*H04N 11/02* (2006.01)
(Continued)

(52) U.S. Cl.
CPC ......... *H04N 21/4821* (2013.01); *H04N 19/52* (2014.11); *H04N 19/61* (2014.11)

(58) Field of Classification Search
CPC ..... H04N 21/4821; H04N 19/52; H04N 19/61
(Continued)

(56) References Cited

U.S. PATENT DOCUMENTS

| 2011/0103485 A1 | 5/2011 | Sato et al. |
| 2012/0008690 A1* | 1/2012 | Lee ............... H04N 19/105 |
| | | 375/240.16 |

(Continued)

FOREIGN PATENT DOCUMENTS

| CN | 1665304 A | 9/2005 |
| CN | 101573985 A | 11/2009 |

(Continued)

OTHER PUBLICATIONS

International Search Report dated Sep. 24, 2012 for PCT/KR2012/000555.

*Primary Examiner* — Hee-Yong Kim
(74) *Attorney, Agent, or Firm* — Hauptman Ham, LLP

(57) ABSTRACT

A video encoding method for encoding a current motion vector of a current block, includes: deriving a plurality of candidate predictive motion vectors by using motion vectors of adjacent blocks of the current block; selecting a predictive motion vector of the current block from among the candidate predictive motion vectors; generating a differential motion vector by subtracting the predictive motion vector from the current motion vector; and encoding, into a bitstream, the differential motion vector and a predictive motion vector index for indicating which candidate predictive motion vector is selected as the predictive motion vector among the candidate predictive motion vectors, where the deriving of the candidate predictive motion vectors includes: deriving a first candidate predictive motion vector based on adjacent
(Continued)

blocks located at left side of the current block; and deriving a second candidate predictive motion vector based on adjacent blocks located at upper side of the current block.

7 Claims, 10 Drawing Sheets

Related U.S. Application Data continuation of application No. PCT/KR2012/000555, filed on Jan. 20, 2012.

(51) Int. Cl.
    *H04L 27/06*     (2006.01)
    *H04N 21/482*     (2011.01)
    *H04N 19/52*     (2014.01)
    *H04N 19/61*     (2014.01)

(58) Field of Classification Search
    USPC .................................................. 375/240.13
    See application file for complete search history.

(56) References Cited

U.S. PATENT DOCUMENTS

| | | |
|---|---|---|
| 2012/0082228 A1 | 4/2012 | Su et al. |
| 2015/0049811 A1 | 2/2015 | Jeon |

FOREIGN PATENT DOCUMENTS

| | | |
|---|---|---|
| KR | 10-2007-0006446 A | 1/2007 |
| KR | 10-2008-0064355 A | 7/2008 |
| KR | 10-2008-0076870 A | 8/2008 |

\* cited by examiner

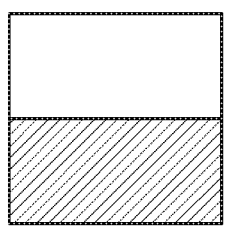 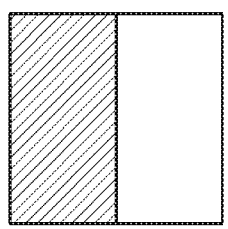
*FIG. 2A*    *FIG. 2B*
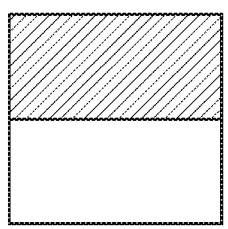 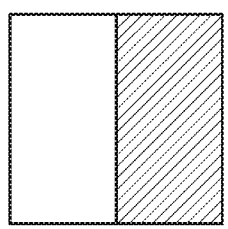 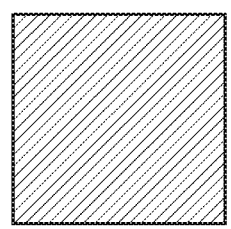
*FIG. 2C*    *FIG. 2D*    *FIG. 2E*

APPARATUS AND METHOD FOR GENERATING/RECOVERING MOTION INFORMATION BASED ON PREDICTIVE MOTION VECTOR INDEX ENCODING, AND APPARATUS AND METHOD FOR IMAGE ENCODING/DECODING USING SAME

CROSS-REFERENCE TO RELATED APPLICATIONS

The present application is a continuation of U.S. patent application Ser. No. 13/946,624 filed Jul. 19, 2013, which a continuation of International Patent Application No. PCT/KR2012/000555, filed Jan. 20, 2012, which claims priority to Korean Patent Application No. 10-2011-0006248, filed on Jan. 21, 2011. The disclosures of the above-listed application are hereby incorporated by reference herein in their entirety.

FIELD

The present disclosure relates to an apparatus and a method for generating/recovering motion information based on predictive motion vector index encoding, and an apparatus and a method for image encoding/decoding using the same, which can improve the compression and decoding efficiencies by efficiently encoding/decoding motion information of a current block by setting a co-located block of a reference frame.

BACKGROUND

The statements in this section merely provide background information related to the present disclosure and may not constitute prior art.

The MPEG (moving picture experts group) and the VCEG (video coding experts group) have developed the H.264/AVC (advanced video coding), which is a video compression standard technology superior to the existing MPEG-4 Part 2 and H.263 standards, and the two groups are developing the HEVC (high efficiency video coding) technology. In a similar way to the known video compression technologies, the TMuC (Test Model under Consideration) by the MPEG and the VCEG divides an image into blocks, takes a motion estimation or intra prediction to frequency-transform and quantize residual blocks and then entropy-encode the same. In the TMuC of the HEVC, the motion prediction is performed by using a multi-reference frame, so as to encode a reference frame index and a motion vector as motion information and then output the encoded information into a bitstream.

TMuC of HEVC forms a set of candidate predictive motion vectors with motion vectors of peripheral blocks of the current block to encode and a motion vector of a co-located block at the same position in the reference frame as that of the current block, determine a predictive motion vector for having the lowest bit rate-distortion cost in the candidate predictive motion vector set, and encodes as motion information the index of the predictive motion vector, a differential motion vector between a current motion vector and the predictive motion vector and the reference frame index.

SUMMARY

In accordance with some embodiments, a method performed by a video encoding apparatus for encoding a current motion vector of a current block, comprises: deriving a plurality of candidate predictive motion vectors by using motion vectors of adjacent blocks of the current block; selecting a predictive motion vector of the current block from among the candidate predictive motion vectors; generating a differential motion vector by subtracting the predictive motion vector from the current motion vector; and encoding, into a bitstream, the differential motion vector and a predictive motion vector index for indicating which candidate predictive motion vector is selected as the predictive motion vector among the candidate predictive motion vectors. Herein, the deriving of the candidate predictive motion vectors comprises: deriving a first candidate predictive motion vector based on adjacent blocks located at left side of the current block; and deriving a second candidate predictive motion vector based on adjacent blocks located at upper side of the current block. Herein, the first valid motion vector found by sequentially scanning the adjacent blocks located at the left side of the current block in an upward direction is selected as the first candidate predictive motion vector. Herein, the adjacent blocks located at the left side of the current block include at least one pixel adjacent to the current block.

In accordance with some embodiments, a method performed by a video decoding apparatus for decoding a current motion vector of a current block, comprises: reconstructing a differential motion vector and predictive motion vector index by decoding a bitstream; deriving a plurality of candidate predictive motion vectors by using motion vectors of adjacent blocks of the current block; selecting, as a predictive motion vector of the current block, a candidate predictive motion vector which is indicated by the predictive motion vector index among the candidate predictive motion vectors; and reconstructing the current motion vector of the current block by adding the predictive motion vector and the differential motion vector. Herein, the deriving of the candidate predictive motion vectors comprises: deriving a first candidate predictive motion vector based on adjacent blocks located at left side of the current block; and deriving a second candidate predictive motion vector based on adjacent blocks located at upper side of the current block. Herein, the first valid motion vector found by sequentially scanning the adjacent blocks located at the left side of the current block in an upward direction is selected as the first candidate predictive motion vector. Herein, the adjacent blocks located at the left side of the current block include at least one pixel adjacent to the current block.

In accordance with some embodiments, a video decoding apparatus for decoding a current motion vector of a current block, comprises a decoder, a predictive motion vector setting unit and an adder. The decoder, implemented by one or more processors, is configured to reconstruct a differential motion vector and predictive motion vector index by decoding a bitstream. The predictive motion vector setting unit, implemented by one or more processors, is configured to derive a plurality of candidate predictive motion vectors by using motion vectors of adjacent blocks of the current block, and select, as a predictive motion vector of the current block, a candidate predictive motion vector which is indicated by the predictive motion vector index among the candidate predictive motion vectors. And the adder, implemented by one or more processors, is configure to reconstruct the current motion vector of the current block by adding the predictive motion vector and the differential motion vector. Herein the predictive motion vector setting unit is further configured to derive a first candidate predictive motion vector based on adjacent blocks located at left side of the current block, and derive a second candidate predictive motion vector based on adjacent blocks located at upper side of the current block. Herein the predictive motion vector setting unit is configured to is select, as the first candidate predictive motion vector, the first valid motion vector found by sequentially scanning the adjacent blocks located at the left side of the current block in an upward direction. Herein the adjacent blocks located at the left side of the current block include at least one pixel adjacent to the current block.

BRIEF DESCRIPTION OF DRAWINGS

FIGS. 2A to 2E are exemplary diagrams of an index allocation method currently used in the HEVC TM;

DETAILED DESCRIPTION

Figure 1:
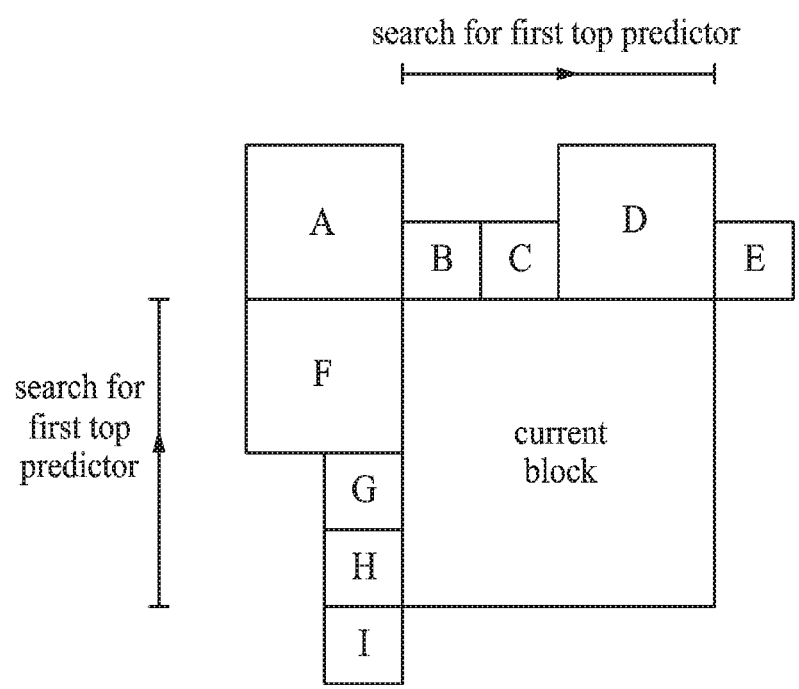
FIG. 1 is an exemplary diagram of an existing motion vector encoding method in use with TM of HEVC.

The present disclosure provides an apparatus and a method for generating/recovering motion information based on predictive motion vector index encoding, and an apparatus and a method for image encoding/decoding using the same, which can improve the compression and decoding efficiencies by efficiently encoding/decoding motion information of a current block by setting a co-located block of a reference frame to have the same size as that of the current block and considering the temporal characteristic of an image by using the information of the co-located block of the reference frame in encoding an index value of a candidate motion vector.

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

A video encoding apparatus and/or a video decoding apparatus according to one or more embodiments of the present disclosure may correspond to a user terminal such as a PC (personal computer), notebook computer, PDA (personal digital assistant), PMP (portable multimedia player), PSP (PlayStation Portable), wireless communication terminal, smart phone, TV, and the like. A video encoding apparatus and/or a video decoding apparatus according to one or more embodiments may correspond to a server terminal such as an application server, service server and the like. A video encoding apparatus and/or a video decoding apparatus according to one or more embodiments may correspond to various apparatuses each including (a) a communication apparatus such as a communication modem and the like for performing communication with various types of devices or a wired/wireless communication networks, (b) a memory for storing various programs and data that encode or decode a video or perform an inter/intra-prediction for encoding or decoding, and (c) a microprocessor to execute a program so as to perform calculation and controlling, and the like.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bitstream may be decoded in the video decoding apparatus and may be reconstructed to a video, and the video may be played back.

In general, a video may be formed of a series of pictures (also referred to herein as "images" or "frames"), and each picture is divided into predetermined regions such as blocks. The divided blocks may be classified into an intra block or an inter block depending on an encoding scheme. The intra-block refers to a block that is encoded based on an intra-prediction coding scheme. The intra-prediction coding scheme predicts pixels of a current block by using pixels of blocks that were encoded and decoded to be reconstructed in a current picture to which encoding is to be performed, so as to generate a prediction block, and encodes pixel differences between the prediction block and the current block. The inter-block means a block that is encoded based on an inter-prediction coding scheme. The inter-prediction encoding scheme predicts a current block in a current picture referring to at least one previous picture and/or at least one subsequent picture, so as to generate a prediction block, and encodes differences between the prediction block and the current block. Here, a frame that is referred to in encoding or decoding the current picture (i.e., current frame) is called a reference frame. The entropy coding indicates a lossless data compression scheme that is independent of the specific characteristics of the medium.

FIG. 1 is an example of a motion vector encoding method currently used in a TM (Test Model) of the HEVC. In FIG. 1, the alphabet letters from A to I are ID codes for identifying previously encoded neighbor blocks with respect to a current block.

In the TM of the HEVC, in order to select a predictive motion vector of the current block, a candidate predictive motion vector set is configured by five motion vectors, including a left motion vector, an upper motion vector, a corner motion vector, a median motion vector, and a co-location motion vector, as candidate component predictive motion vectors. When any one of the five predictive motion vectors does not include a relevant predictive motion vector, it is not included in the candidate predictive motion vector set.

The left motion vector is set with a first valid motion vector found through an upward scanning of the blocks (F, G and H in FIG. 1) located at the left of the current block from bottom to top. A motion vector is determined to be valid when the motion vector exists and uses the same reference frame as that of the current block.

The upper motion vector is set with a first valid motion vector found through a lateral scanning of the blocks (B, C and D in FIG. 1) located at the upper side of the current block from left to right. The candidate corner motion vector is set with a first valid motion vector found through the aforementioned sequence of scanning from an upper-right corner block (E in FIG. 1) of the current block, to a lower-left corner block (I in FIG. 1) of the current block and to an upper-left corner block (A in FIG. 1) of the current block.

The median motion vector is configured by values obtained through median operations on X and Y values calculated from each X and Y value of the left motion vector, the upper motion vector and the corner motion vector.

The co-location motion vector (MV) is determined through a motion vector (MVcol) of a co-located block at the same position in a reference frame as that of the current block. The co-located block uses the same size as that of the current block. When the co-located block has been divided into a plurality of blocks, a motion vector of a block at a predetermined position, for example, a motion vector of an upper-left block, is set as a motion vector of the co-located block. In this event, if the temporal distance between a reference frame at which a co-located block is located and a co-location reference frame referred to by a co-location motion vector is put as t1 and the temporal distance between the reference frames at which the current block and the co-located block are located is put as t2, the co-location motion vector can be set through scaling of MV=MVcol* (t2/t1).

In the HEVC TM, entropy encoding is performed based on an assumption that, when predictive motion vector indexes are adaptively allocated to the motion vectors of the predictive motion vector set configured in the method as described above according to the size and position of the block to be currently encoded, the smaller the index value, the higher the prediction rate.

FIGS. 2A to 2E are examples of an index allocation method currently used in the HEVC TM. In the HEVC TM, one 2N×2N (N is a power of 2) square block can be horizontally or vertically divided into sub-blocks and the divided sub-blocks can be then prediction-encoded. In FIG. 2, the shaded areas correspond to a current block to be currently encoded.

FIG. 2A is horizontally dividing a 2N×2N square block into two sub-blocks and then encoding the lower sub-block, in which index values (figures in the parentheses) may be allocated to the candidate configurative predictive motion vectors in the sequence of the left motion vector (0), the median motion vector (1), the upper motion vector (2), the corner motion vector (3), and the co-location motion vector (4).

FIG. 2B illustrates vertically dividing a 2N×2N square block into two sub-blocks and then encoding the left sub-block, in which index values may be allocated to the candidate configurative predictive motion vectors in the sequence of the left motion vector (0), the median motion vector (1), the upper motion vector (2), the corner motion vector (3), and the co-location motion vector (4).

FIG. 2C shows horizontally dividing a 2N×2N square block into two sub-blocks and then encoding the upper sub-block, in which index values (figures) may be allocated to the candidate component predictive motion vectors in the sequence of the upper motion vector (0), the left motion vector (1), the median motion vector (2), the corner motion vector (3), and the co-location motion vector (4).

FIG. 2D is a case of vertically dividing a 2N×2N square block into two sub-blocks and then encoding the right sub-block, in which index values (figures) may be allocated to the candidate component predictive motion vectors in the sequence of the corner motion vector (0), the left motion vector (1), the upper motion vector (2), the median motion vector (3), and the co-location motion vector (4).

FIG. 2E illustrates encoding in exemplary case, other than the cases shown in FIGS. 2A to 2D, in which index values may be allocated to the candidate component predictive motion vectors in the sequence of the median motion vector (0), the left motion vector (1), the upper motion vector (2), the corner motion vector (3), and the co-location motion vector (4).

The allocation of the index values to the candidate predictive motion vectors is intended to achieve efficient encoding of the index values according to the spatial characteristics of an image. The inventor(s) has, however, experienced that since the candidate motion vector index encoding method as described above does not consider an encoding according to the temporal characteristics of an image, it is difficult to achieve an efficient encoding.

Figure 3:
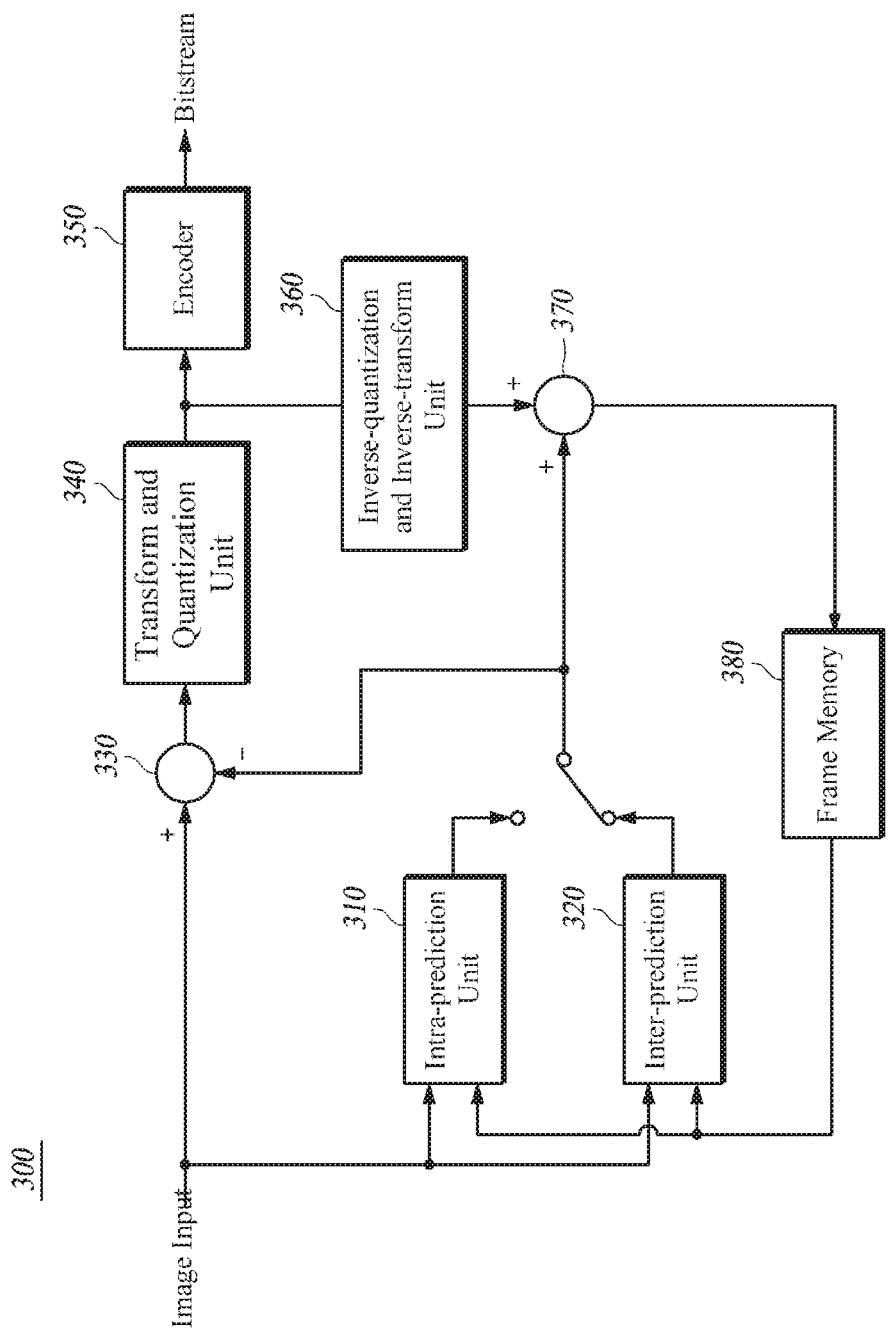
FIG. 3 is a schematic block diagram of a video encoding apparatus according to at least one embodiment of the present disclosure.

FIG. 3 is a schematic block diagram of a video encoding apparatus according to at least one embodiment of the present disclosure. Referring to FIG. 3, a video encoding apparatus 300 according to at least one embodiment of the present disclosure includes an intra prediction unit 310, an inter prediction unit 320, a subtraction unit 330, a transform and quantization unit 340, an encoding unit 350, an inverse-quantization and inverse-transform unit 360, an adder 370, and a frame memory 380. Other components of the video encoding apparatus 300, such as the intra prediction unit 310, the inter prediction unit 320, the subtraction unit 330, the transform and quantization unit 340, the encoding unit 350, the inverse-quantization and inverse-transform unit 360, and the adder 370 are implemented by one or more processors and/or application-specific integrated circuits (ASICs).

Input images to be encoded are input in units of coding blocks. In the embodiments of the present disclosure, encoded blocks have a form of M×N wherein M and N may be either the same or different from each other. Further, an encoded block may be divided into prediction unit blocks of various sizes.

The intra prediction unit 310 generates a prediction block by using adjacent pixels in order to predict a current prediction unit block. That is, the intra prediction unit 310 generates a prediction block according to a mode of the intra prediction unit 310 by using adjacent pixels of the current block already reconstructed through a previous encoding.

The inter prediction unit 320 generates and outputs a prediction block by using a reference frame in order to predict a current prediction unit block. That is, the inter prediction unit 320 generates motion information, which includes a motion vector, a reference frame index, etc., through a motion estimation according to a mode of the inter prediction unit 320 in a previous frame already reconstructed through a previous encoding, and then generates a prediction block in the course of a motion compensation process using the motion information. Further, the inter prediction unit 320 generates index information of a predictive motion vector of a current block based on motion information of a co-located block of a reference frame and generates motion information of the current block in which the motion information includes at least one selected from the group consisting of a reference frame index, predictive motion vector index information, etc. together with a differential motion vector obtained by subtracting the predictive motion vector from a motion vector of the current block. To this end, the inter prediction unit 320 may include a motion information generation unit (not shown). The motion information generation unit may exist as an independent hardware or software module, like the motion information generation apparatus 400 shown in FIG. 4. The configuration and operation of the motion information generation unit will be described below in detail with reference to FIG. 4.

The subtraction unit 330 subtracts a prediction block from the current block to thereby generate a residual block. That is, the subtraction unit 330 generates a residual block by subtracting a pixel value of a prediction block generated by the intra prediction unit 310 or by the inter prediction unit 320 from the pixel value of the current block.

The transform and quantization unit 340 transforms the residual block generated by the subtraction unit 330 into frequency coefficients (i.e., a transformed residual block with frequency coefficients) and then quantizes the transformed residual block in which has one or more frequency coefficients. That is, the transform and quantization unit 340 generates a residual block having frequency coefficients by transforming residual coefficients (which are corresponding to coefficients in spatial domain) of the residual block generated by the subtraction unit 330 with frequency coefficients (which are corresponding to coefficients in frequency domain) and then quantizes the transformed residual block having the frequency coefficients. In this event, various transform techniques of transforming an image signal of a spatial domain into an image signal of a frequency domain, such as Hadamard transform or Discrete Cosine Transform Based Integer Transform, may be used for the transform, and various quantization techniques, such as Dead Zone Uniform Threshold Quantization (DZUTQ) or Quantization Weighted Matrix, may be used for the quantization.

The encoding unit 350 may generate encoded data (bitstream) by encoding a residual block which has been transformed and quantized by the transform and quantization unit 340. For the encoding, an entropy encoding technology may be used. However, the present disclosure is not limited thereto and allows use of various encoding technologies.

Further, the encoding unit 350 may include (i) a variety of information required for decoding a bitstream (i.e., encoded data or encoded quantized frequency coefficients), such as motion information, as well as (ii) a bitstream obtained by encoding quantized frequency coefficients, in the encoded data. In other words, the encoded data may include a first field including a bitstream in which a Coded Block Pattern (CBP), a Delta Quantization Parameter (DQP), and quantized frequency coefficients are encoded, and a second field including bits for information (e.g. intra prediction mode in the case of intra prediction or motion information in the case of inter prediction) required for the prediction.

The inverse-quantization and inverse-transform unit 360 inversely quantizes a quantized transformed residual block, transformed and quantized by the transform and quantization unit 340, into a transformed residual block and inversely transforms the transformed residual block into a residual block, so as to reconstruct the residual block. The inverse-quantization and inverse-transformation can be achieved by inversely performing the transform and quantization performed by the transform and quantization unit 340. That is, the inverse-quantization and inverse-transform unit 360 may generate a residual block having residual coefficients by inversely quantizing a quantized block transferred from the transform and quantization unit 340 and then inversely transforming the inverse-quantized frequency block into a residual block.

The adder 370 generates a reconstructed block by adding a prediction block generated by the intra prediction unit 310 or by the inter prediction unit 320 and a residual block generated by the inverse-quantization and inverse-transform unit 360.

The frame memory 380 stores the reconstructed block reconstructed by the adder 370, so that the reconstructed block can be used as a prediction block at the time of intra prediction or inter prediction.

Figure 4:
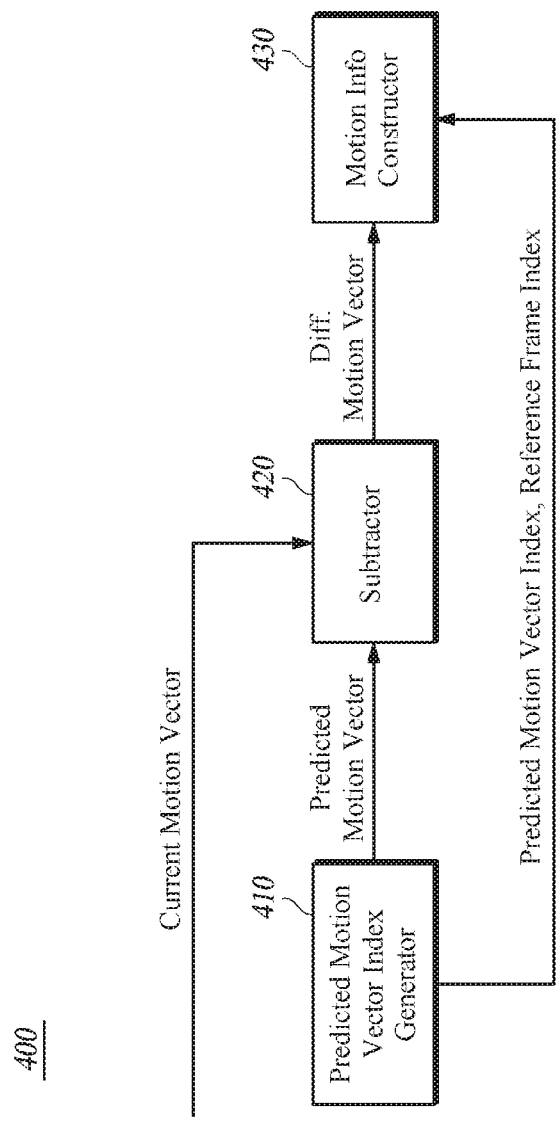
FIG. 4 is a schematic block diagram of motion information generating apparatus according to at least one embodiment of the present disclosure.

FIG. 4 is a schematic block diagram of a motion information generating apparatus according to at least one embodiment of the present disclosure. A motion information generating apparatus 400 according to at least one embodiment of the present disclosure may include a predictive motion vector index generator 410, a subtractor 420, and a motion information constructor 430. Other components of motion information generating apparatus 400, such as the predictive motion vector index generator 410, the subtractor 420, and the motion information constructor 430 are implemented by one or more processors and/or application-specific integrated circuits (ASICs).

The predictive motion vector index generator 410 generates index information of a predictive motion vector of a current block based on motion information of a co-located block of a reference frame. In this event, a co-located block of a reference frame refers to a block located at the same position as that of the current block in a reference frame of the current block, for example as a co-located block of a reference frame shown in FIG. 5. To this end, in some embodiments, the predictive motion vector index generator 410 selects as a co-location motion vector a motion vector extending most (or lowest) adjacent to the position of the current block to be encoded among motion vectors of the co-located blocks with respect to respective reference frames. Further, the predictive motion vector index generator 410 selects a left motion vector, an upper motion vector, a corner motion vector, and a median motion vector by using, for example, the known HEVC TMuC method and configures a candidate predictive motion vector set by the selected motion vectors together with at least one co-location motion vector. Next, the predictive motion vector index generator 410 allocates an index value to the predictive motion vector based on the co-location motion vector. When the co-location motion vector approaches the position of the current block within a preset threshold value, the index value of the predictive motion vector is configured, in some embodiments, such that the lowest index value, 0, is given to the co-location motion vector so that the index value of the co-location motion vector can be encoded with the least number of bits.

The subtractor 420 generates a differential motion vector by subtracting the predictive motion vector from the motion vector of the current block.

The motion information constructor 430 constructs motion information of the current block in which the motion information of the current block includes at least one selected from the group consisting of a reference frame index, predictive motion vector index information, a differential motion vector, etc.

Figure 5:
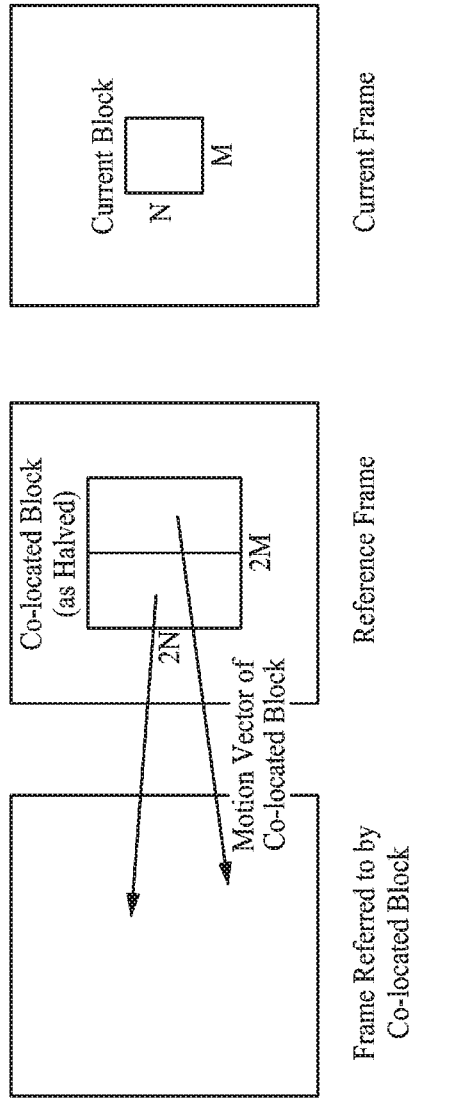
FIG. 5 is an exemplary diagram of a co-located block of a reference frame usable for encoding motion information of a current block and a frame referred to by the co-located block of the reference frame.

FIG. 5 illustrates an example of a co-located block of a reference frame usable for encoding of motion information of a current block and a frame referred to by the co-located block of the reference frame.

As shown in FIG. 5, a co-located block of a reference frame refers to a co-located block located at the same spatial position as that of a current block to be encoded through motion compensation of a current frame in the reference frame. In this event, the co-located block of the reference frame may have a size different from that of the current block. In at least one embodiment of the present disclosure, the horizontal and vertical dimensions of the co-located block illustrated as an example corresponds to doubles of those of the current block, respectively.

Figure 6:
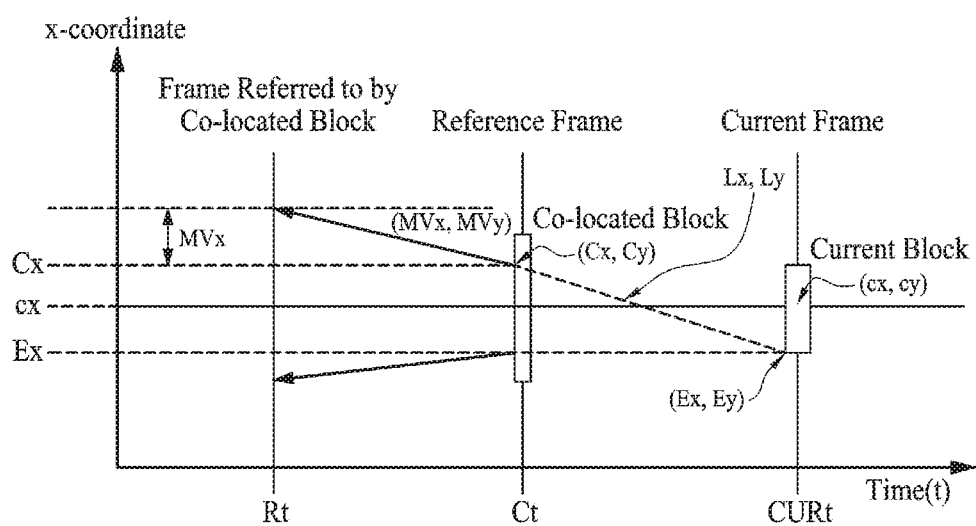
FIG. 6 is a graph of positions of motion vectors and blocks by only x coordinates on the time axis.

The size of the co-located block may be encoded in units of sequences, slices, etc. and be then included in a bitstream. Further, the co-located block may have a plurality of motion vectors, as in the case where it is encoded after being divided into a plurality of blocks or encoded by a compression method. In the example illustrated in FIG. 5, the co-located block has been encoded after being divided into two blocks, each of which has its own motion vector. FIG. 6 is a graph illustrating positions of motion vectors and blocks by only x coordinates on the time axis. The predictive motion vector index generator 410 of FIG. 4 may generate index information of a predictive motion vector of a current block based on motion information of a co-located block at the same spatial position as that of the current block in the reference frame.

Figure 7:
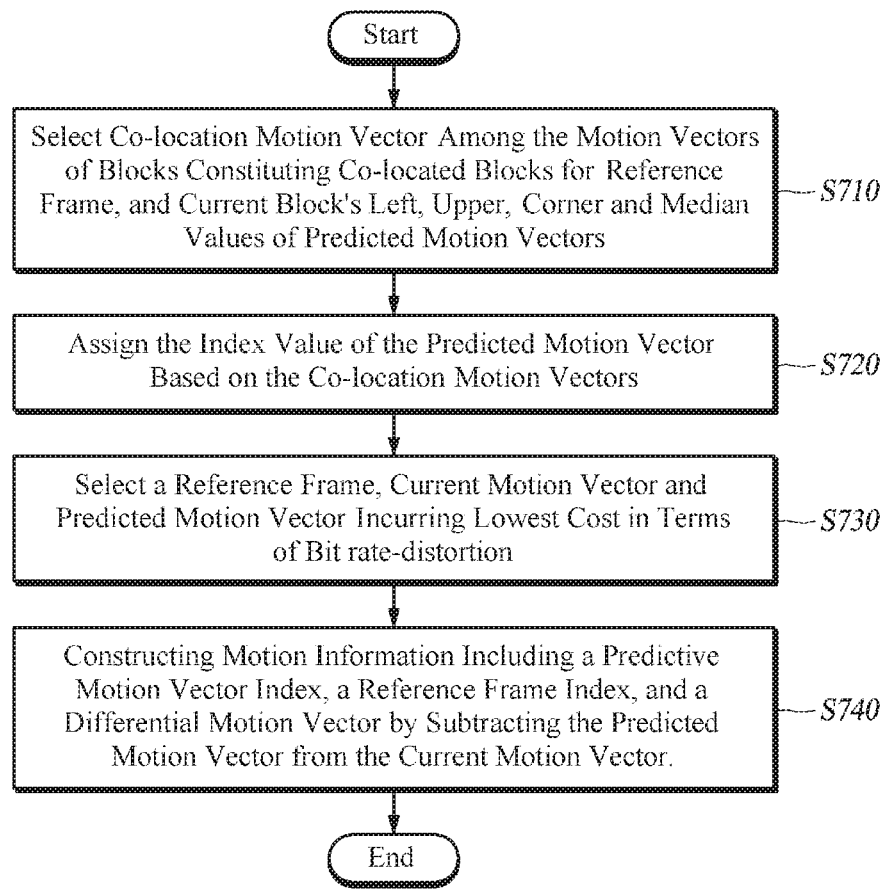
FIG. 7 is a flowchart of generating motion information according to at least one embodiment of the present disclosure.

FIG. 7 is a flowchart illustrating a method of generating motion information according to at least one embodiment of the present disclosure.

Referring to FIGS. 4 and 7, the predictive motion vector index generator 410 first selects as a co-location motion vector a motion vector, extending most adjacent to the position of the current block to be encoded, among motion vectors of co-located blocks with respect to respective reference frames. Further, the predictive motion vector index generator 410 selects a left motion vector, an upper motion vector, a corner motion vector, and a median motion vector according to the same method as the known HEVC TMuC method and configures a candidate predictive motion vector set by the selected motion vectors (i.e., the left motion vector, the upper motion vector, the corner motion vector, and the median motion vector) together with the co-location motion vector (step S710).

Next, the predictive motion vector index generator 410 allocates an index value to the predictive motion vector based on the co-location motion vector (step S720). In this event, a predictive motion vector, a current motion vector, and a reference frame requiring a lowest cost in view of the bit rate-distortion are selected (step S730).

When the co-location motion vector approaches the position of the current block within a preset threshold value, the index value of the predictive motion vector is configured such that the lowest index value, 0, is given to the co-location motion vector so that the index value of the co-location motion vector can be encoded with the least number of bits. In at least one embodiment, the lowest value may be given to the co-location motion vector while maintaining the sequence of indexes of the other predictive motion vectors in the index allocation method of the known TMuC. In the case of FIG. 1A, the index values may be allocated as follows: a co-location motion vector (0), a left motion vector (1), a median motion vector (2), an upper motion vector (3), and a corner motion vector (4).

The determination of whether the co-location motion vector approaches the position of the current block within a given threshold value can be made as follows (see FIGS. 5 and 6). Here, the determination is performed by the inter prediction unit 320 or the predictive motion vector index generator 410.

If the spatial position of the co-located block is (Cx, Cy), the temporal position thereof is Ct, the co-location motion vector is (MVx, MVy) and the temporal position of the reference frame referred to by the co-located block is Rt, the proximity degree d to the position (cx, cy) of the current block located at the temporal position CURt can be calculated as follows. First, straight lines Lx and Ly according to time change t with respect to components x and y of a co-location motion vector can be obtained as follows.

Lx Straight Line Equation (x is a function of t)

$$x-Cx=MVx/(Ct-Rt)*(t-Ct)$$

Ly Straight Line Equation (y is a function of t)

$$y-Cy=MVy/(Ct-Rt)*(t-Ct)$$

From the above straight line Equations, the position (Ex, Ey) extending from the temporal position CURt of the current frame are obtained as follows.

$$Ex=MVx/(Ct-Rt)*(CURt-Ct)+Cx$$

$$Ey=MVy/(Ct-Rt)*(CURt-Ct)+Cy$$

The proximity degree d to the position (cx, cy) of the current block can be obtained from the distance from the extending position (Ex, Ey). The distance can be calculated by various methods, such as Euclidean distance, city block distance, etc. At least one n embodiment of the present disclosure employs the City distance.

The city block distance corresponds to a sum of absolute values of differences, which is defined by $$d=\|cx-Ex\|+\|cy-Ey\|$$

In the determination of whether the co-location motion vector approaches the position of the current block within a threshold value, the threshold value may be encoded in units of sequences, slices, etc. and be then included in a bit stream. A value showing the best compression ratio in experiments may be determined as the threshold value.

The subtractor 420 generates a differential motion vector by subtracting the predictive motion vector from the motion vector of the current block.

The motion information constructor 430 constructs (configures) motion information including at least one selected from the group consisting of a differential motion vector, a predictive motion vector index, and a reference frame index (step S740).

Motion information according to at least one embodiment of the present disclosure includes a reference frame index, a predictive motion vector index, and a differential motion vector. When the motion vector resolution technology of the TMuC is used, the motion information may include this information also.

According to at least one embodiment of the present disclosure, a co-location motion vector may be determined as being a motion vector of a block that encompasses the current block to be encoded among co-located blocks as mapped to the current frame to be encoded according to the co-located block motion vectors. When the ratio of the blocks of the determined motion vector to encompass the current block is within a threshold value, the index value of the predictive motion vector is configured such that the lowest index value, 0, is given to the co-location motion vector so that the index value of the co-location motion vector can be encoded with the least number of bits.

A motion information generating apparatus as described above with reference to FIGS. 4 to 7 encodes motion information according to the temporal characteristic of an image, thereby improving a compression efficiency of the image.

Figure 8:
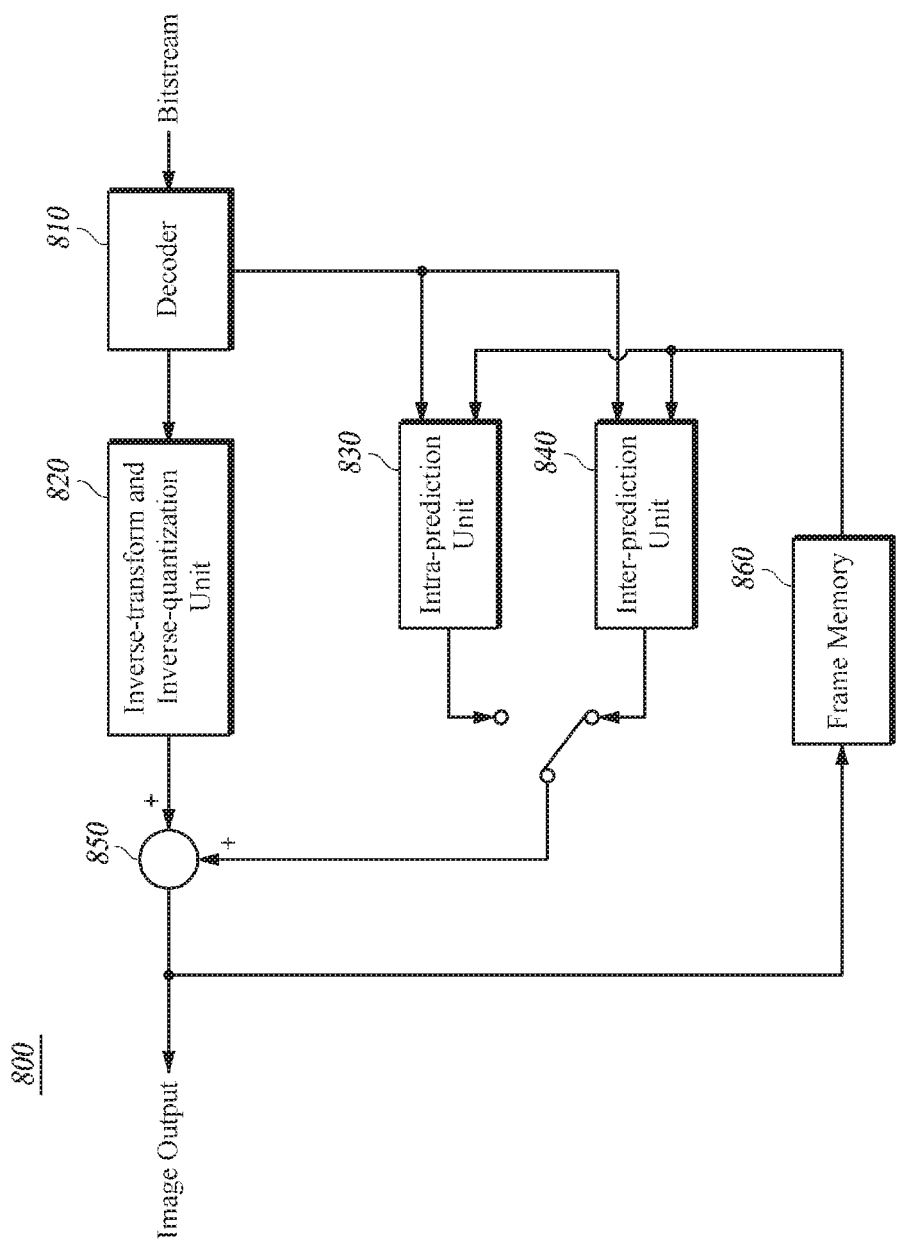
FIG. 8 is a schematic block diagram of a video decoding apparatus according to at least one embodiment of the present disclosure.

FIG. 8 is a schematic block diagram of a video decoding apparatus according to at least one embodiment of the present disclosure.

A video decoding apparatus 800 according to at least one embodiment of the present disclosure includes a decoder 810, an inverse-quantization and inverse-transform unit 820, an intra prediction unit 830, an inter prediction unit 840, an adder 850 and a frame memory 860. Other components of the video decoding apparatus 800, such as the decoder 810, the inverse-quantization and inverse-transform unit 820, the intra prediction unit 830, the inter prediction unit 840, and the adder 850 are implemented by one or more processors and/or application-specific integrated circuits (ASICs).

The decoder 810 decodes encoded data (bitstream) to thereby extract data necessary for block decoding, such as an inter prediction mode, code motion information, an intra prediction mode, and a texture. That is, the decoder 810 decodes the encoded data to extract quantization frequency coefficient row (i.e., quantized frequency coefficients sequence in a row) and inversely scans the quantization frequency coefficient row through various scanning schemes, such as an inverse Zigzag scan, so as to generate a residual block having quantization frequency coefficients. In this event, the decoder 810 may extract and decode an encoded residual block from a first field included in the encoded data, extract information necessary for prediction, such as an intra prediction mode, an inter prediction mode, and motion information, from a second field included in the encoded data, and transfer the extracted information necessary for the prediction to the intra prediction unit 830 or the inter prediction unit 840, so as to enable the corresponding predictor to predict the current block according to the same scheme as that of a corresponding predictor (i.e., the intra prediction unit 310 or the inter prediction unit 320 in FIG. 3) of the video encoding apparatus 300 (see FIG. 3).

The inverse-quantization and inverse-transform unit 820 inversely quantizes a quantized residual block to generate an inverse-quantized residual block, and inversely transforms the generated inverse-quantized residual block to generate a residual block.

The intra prediction unit 830 generates a prediction block of the current block by using information necessary for intra prediction transferred from the decoder 810.

Figure 9:
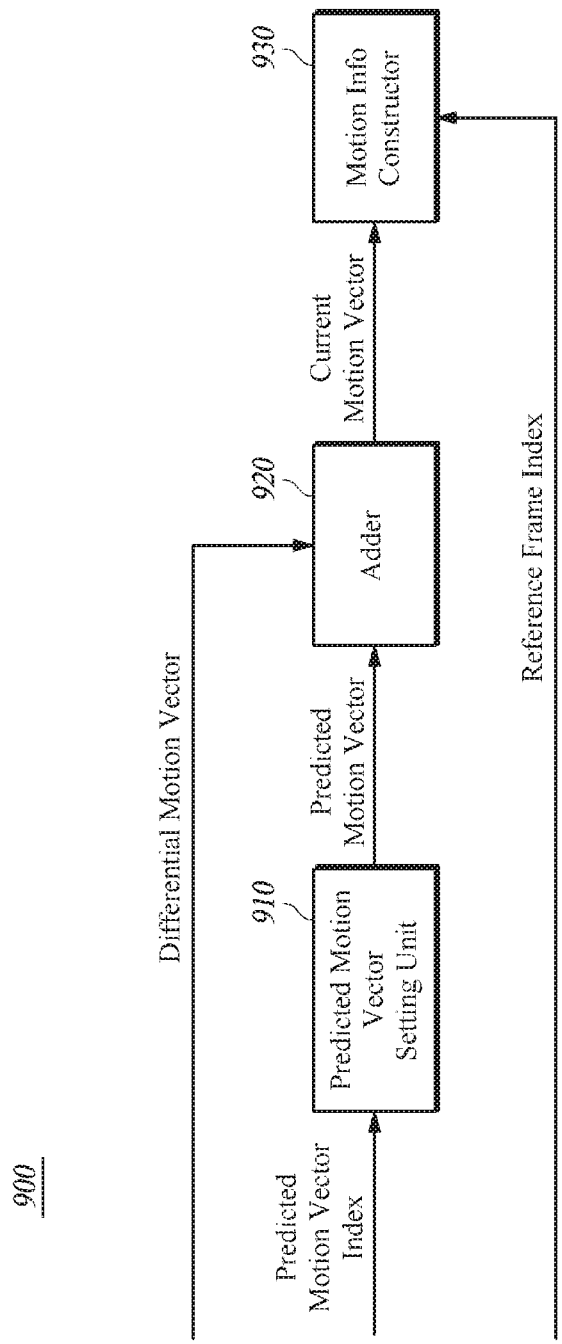
FIG. 9 is a schematic block diagram of a motion information reconstruction apparatus 600 according to at least one embodiment of the present disclosure.

The inter prediction unit 840 generates a prediction block of the current block by using information necessary for inter prediction transferred from the decoder 810. In this event, the inter prediction unit 840 receives motion information from the decoder 810, reconstructs a predictive motion vector according to an index value of the predictive motion vector included in the received motion information, and then adds the reconstructed predictive motion vector and differential motion information included in the received motion information so as to reconstruct motion information of the current block, and generates a prediction block of the current block by using the reconstructed motion information. The inter prediction unit 840 may include a motion information reconstruction unit (not shown), which may exist as an independent hardware or software module, and may exist as a motion information reconstruction apparatus 900 as shown in FIG. 9. The operation of the motion information reconstruction apparatus 900 will be described below in detail with reference to FIG. 9.

The adder 850 reconstructs a current block by adding a residual block and a prediction block. The current block reconstructed by the adder 850 may be transferred to the frame memory 860 for use in prediction of another block by the predictor 830 or 840.

The frame memory 860 stores a reconstructed image to enable the generation of intra and inter prediction blocks.

The intra prediction unit 830 includes a motion information reconstruction unit for receiving a predictive motion vector index, a reference frame index, and a differential motion vector and reconstructing a current motion vector to configure motion information. The motion information reconstruction unit may exist as an independent hardware or software module, and may exist as a motion information reconstruction apparatus 900 as shown in FIG. 9.

FIG. 9 is a schematic block diagram of a motion information reconstruction apparatus 900 according to at least one embodiment of the present disclosure.

The motion information reconstruction apparatus 900 according to at least one embodiment of the present disclosure includes a predictive motion vector setting unit 910 for configuring a predictive motion vector by receiving an index value of the predictive motion vector included in motion information from the decoder 810, an adder 920 for configuring a current motion vector by adding the predictive motion vector and a differential motion vector included in the motion information, and a motion information constructor 930 for reconstructing the motion information by receiving a reference frame index included in the motion information together with the reconstructed motion vector. Other components of the motion information reconstruction apparatus 900, such as the predictive motion vector setting unit 910, the adder 920 and the motion information constructor 930 are implemented by one or more processors and/or application-specific integrated circuits (ASICs).

In a manner identical or similar to that at the time of encoding, the predictive motion vector setting unit 910 inspects motion vectors of a co-located block, selects a motion vector extending most adjacent to the position of the current block to be encoded as a co-location motion vector, and configures a candidate predictive motion vector set including a co-location motion vector, a left motion vector, an upper motion vector, a corner motion vector, and a median motion vector. Further, when the co-location motion vector approaches the position of the current block within a preset threshold value, the predictive motion vector setting unit 910 may configure index values of predictive motion vectors such that the lowest index value, 0, is given to the co-location motion vector and a motion vector corresponding to the received index value is set as the predictive motion vector.

Figure 10:
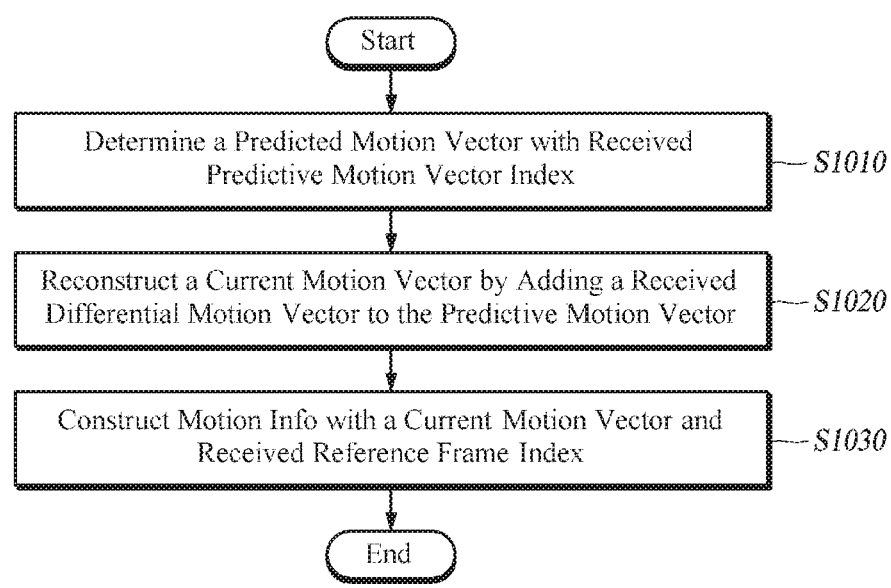
FIG. 10 is a flowchart of reconstructing motion information according to at least one embodiment of the present disclosure.

FIG. 10 is a flowchart of reconstructing motion information according to at least one embodiment of the present disclosure.

Referring to FIG. 10, the motion information reconstruction apparatus 900 according to at least one embodiment of the present disclosure receives a predictive motion index value from the decoder 810 and sets a predictive motion vector (step S1010), adds the predictive motion vector and a differential motion vector input from the decoder 810 to reconstruct the current motion vector (step S1020), and configures motion information by the reference frame index input from the decoder together with the reconstructed motion vector (step S1030).

In the meantime, a video encoding/decoding apparatus according to at least one embodiment of the present disclosure may be implemented by connecting the encoded data (bitstream) output port of the video encoding apparatus 300 shown in FIG. 3 to the encoded data (bitstream) input port of the video decoding apparatus 800 shown in FIG. 8.

According to the present disclosure as described above, motion information of a current block can be efficiently encoded/decoded by setting a co-located block of a reference frame to have the same size as that of the current block and using the information of the co-located block of the reference frame in encoding an index value of a candidate motion vector.

Further, according to at least one embodiment of the present disclosure, the compression efficiency can be improved by considering the temporal characteristic of an image with the use of information of a co-located block of a reference frame in encoding the current block motion information.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A video encoding method for encoding a current motion vector of a current block, the method comprising:
deriving a plurality of candidate predictive motion vectors by using motion vectors of adjacent blocks of the current block;
selecting a predictive motion vector of the current block from among the candidate predictive motion vectors;
generating a differential motion vector by subtracting the predictive motion vector from the current motion vector; and
encoding, into a bitstream, the differential motion vector and a predictive motion vector index for indicating which candidate predictive motion vector is selected as the predictive motion vector among the candidate predictive motion vectors,
wherein the deriving of the candidate predictive motion vectors comprises:
deriving a first candidate predictive motion vector based on adjacent blocks located at left side of the current block; and
deriving a second candidate predictive motion vector based on adjacent blocks located at upper side of the current block,
wherein a valid motion vector first found by sequentially scanning the adjacent blocks located at the left side of the current block in an upward direction is selected as the first candidate predictive motion vector,
wherein a motion vector of an adjacent block which refers to a same reference frame as the current motion vector of the current block among the adjacent blocks located at the left side of the current block is set as the valid motion vector,
wherein the adjacent blocks located at the left side of the current block include at least one pixel adjacent to the current block.

2. The method of claim 1, wherein the first candidate predictive motion vector is assigned a lower index value than the second candidate predictive motion vector.

3. A video decoding method for decoding a current motion vector of a current block, the method comprising:
reconstructing a differential motion vector and predictive motion vector index by decoding a bitstream;
deriving a plurality of candidate predictive motion vectors by using motion vectors of adjacent blocks of the current block;
selecting, as a predictive motion vector of the current block, a candidate predictive motion vector which is indicated by the predictive motion vector index among the candidate predictive motion vectors; and
reconstructing the current motion vector of the current block by adding the predictive motion vector and the differential motion vector,
wherein the deriving of the candidate predictive motion vectors comprises:
deriving a first candidate predictive motion vector based on adjacent blocks located at left side of the current block; and
deriving a second candidate predictive motion vector based on adjacent blocks located at upper side of the current block,
wherein a valid motion vector first found by sequentially scanning the adjacent blocks located at left side of the current block in an upward direction is selected as the first candidate predictive motion vector, wherein a motion vector of an adjacent block which refers to a same reference frame as the current motion vector of the current block among the adjacent blocks located at the left side of the current block is set as the valid motion vector, wherein the adjacent blocks located at the left side of the current block include at least one pixel adjacent to the current block.

4. The method of claim 3, wherein the first candidate predictive motion vector is assigned a lower index value than the second candidate predictive motion vector.

5. A video decoding apparatus for decoding a current motion vector of a current block, the apparatus comprising:
   a decoder, implemented by one or more processors, configured to reconstruct a differential motion vector and predictive motion vector index by decoding a bitstream;
   a predictive motion vector setting unit, implemented by one or more processors, configured to
   derive a plurality of candidate predictive motion vectors by using motion vectors of adjacent blocks of the current block, and
   select, as a predictive motion vector of the current block, a candidate predictive motion vector which is indicated by the predictive motion vector index among the candidate predictive motion vectors; and
   an adder, implemented by one or more processors, configure to reconstruct the current motion vector of the current block by adding the predictive motion vector and the differential motion vector, wherein the predictive motion vector setting unit is further configured to derive a first candidate predictive motion vector based on adjacent blocks located at left side of the current block, and derive a second candidate predictive motion vector based on adjacent blocks located at upper side of the current block, wherein the predictive motion vector setting unit is configured to is select, as the first candidate predictive motion vector, a valid motion vector first found by sequentially scanning the adjacent blocks located at the left side of the current block in an upward direction, wherein a motion vector of an adjacent block which refers to a same reference frame as the current motion vector of the current block among the adjacent blocks located at the left side of the current block is set as the valid motion vector, wherein the adjacent blocks located at the left side of the current block include at least one pixel adjacent to the current block.

6. The apparatus of claim 5, wherein the first candidate predictive motion vector is assigned a lower index value than the second candidate predictive motion vector.

7. The apparatus of claim 5, wherein the predictive motion vector setting unit is configured to a candidate predictive motion vector based on a co-location motion vector of a co-located block in a reference frame.

* * * * *